US008555250B2

(12) United States Patent
Fanning et al.

(10) Patent No.: US 8,555,250 B2
(45) Date of Patent: Oct. 8, 2013

(54) STATIC SEMANTIC ANALYSIS OF DYNAMIC LANGUAGES (75) Inventors: Michael C. Fanning, Redmond, WA (US); Frederico A. Mameri, Seattle, WA (US); Zachary A. Nation, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 206 days.

(21) Appl. No.: 13/149,651

(22) Filed: May 31, 2011

(65) Prior Publication Data

US 2012/0311535 A1  Dec. 6, 2012

(51) Int. Cl.
*G06F 9/44* (2006.01)

(52) U.S. Cl.
USPC ........... 717/120; 717/106; 717/114; 717/126; 717/138; 717/139

(58) Field of Classification Search
None
See application file for complete search history.

(56) References Cited

U.S. PATENT DOCUMENTS

| | | | | |
|---|---|---|---|---|
| 5,535,391 | A * | 7/1996 | Hejlsberg et al. | 717/140 |
| 6,973,646 | B1 | 12/2005 | Bordawekar | |
| 7,451,435 | B2 * | 11/2008 | Hunt et al. | 717/120 |
| 7,530,056 | B1 | 5/2009 | Yaari et al. | |
| 2002/0162091 | A1 * | 10/2002 | Crocker | 717/126 |
| 2004/0049763 | A1 * | 3/2004 | Bloch et al. | 717/116 |
| 2004/0117778 | A1 * | 6/2004 | Sehr et al. | 717/152 |
| 2006/0048097 | A1 * | 3/2006 | Doshi | 717/120 |
| 2007/0038978 | A1 * | 2/2007 | Meijer et al. | 717/106 |
| 2007/0078823 | A1 * | 4/2007 | Ravindran et al. | 707/3 |
| 2007/0220486 | A1 * | 9/2007 | Lammel et al. | 717/114 |
| 2007/0226708 | A1 * | 9/2007 | Varma | 717/139 |
| 2007/0234288 | A1 * | 10/2007 | Lindsey et al. | 717/117 |
| 2008/0066063 | A1 * | 3/2008 | Pouliot | 717/177 |
| 2008/0162885 | A1 * | 7/2008 | Wang et al. | 712/214 |
| 2008/0295083 | A1 * | 11/2008 | Meijer et al. | 717/143 |
| 2009/0313604 | A1 * | 12/2009 | Miceli | 717/120 |
| 2010/0083233 | A1 | 4/2010 | Vanoverberghe | |
| 2010/0257404 | A1 * | 10/2010 | Singh et al. | 714/19 |
| 2010/0299658 | A1 | 11/2010 | Ng et al. | |
| 2011/0202902 | A1 * | 8/2011 | Whelan | 717/126 |
| 2011/0271260 | A1 * | 11/2011 | Kwon et al. | 717/138 |

OTHER PUBLICATIONS

Jeff Foster, "Data Flow Analysis 1—15-411 Compiler Design", Alex Aiken, Oct. 5, 2004, pp. 44, <https://www.google.com/url?sa=t&rct=j&q=&esrc=s&source=web&cd=7&ved=0CF0QFjAG&url=http%3A%2F%2Fwww.cs.cmu.edu%2F~emc%2F15817-s11%2Fdata_flow_1.ppt&ei=0DoUUcO1H8eX0QHFolDoAg&usg=AFQjCNE-hQDSNhV00G7XpDb0v-7zlbYdnw&bvm=bv,42080656,d.dmQ>.*

Paul Carson, "Source code models and their use in assessing software quality", University of Strathclyde,Glasgow, UK, Nov. 2007, pp. 10, <http://www.google.com/url?sa=t&rct=j&q=%22source%20code%20models%20and%20their%20use%20in%20assessing%20software%20quality%source=web&cd=1&cad=rja&ved=0CDwQFjAA&url=http%3A%2F%2Fciteseerx.ist.pus.edu%2Fviewdoc%2Fdownload%3Fdoi%3D10.1.1.27.2176%26rep%3Drep1%26type%3Dpdf&ei=r0cVUYufD8nr0QHkqoD4Cg&usg=AFQjCNHWzvxYG7EluSk8BkfO6xrJELUgNQ&bvm=bv.42080>.*

(Continued)

*Primary Examiner* — Thuy Dao
*Assistant Examiner* — Khanh Dang
(74) *Attorney, Agent, or Firm* — Workman Nydegger (57) ABSTRACT Analyzing dynamic source code. A method includes accessing a specific metadata format data structure. The data structure was created by obtaining one or more first data structures defining constructs in a body of dynamic language source code. From the one or more first data structures, identifier information is extracted for one or more of the defined constructs. Knowledge about the constructs is augmented. The metadata format data structure is parsed to compute metrics about the metadata format data structure. The metrics about the metadata format data structure are provided to a user.

20 Claims, 4 Drawing Sheets (56) References Cited

OTHER PUBLICATIONS

Alejandro Russo, "Dynamic vs. Static Flow-Sensitive Security Analysis", 2010, Chalmers University of Technology, pp. 187-199, <http://ieeexplore.ieee.org/stamp/stamp.jsp?tp=&arnumber=5552646&tag=1>.*

Jakub Mišek, "Mapping of Dynamic Language Constructs into Static Abstract Syntax Trees", 2010, Charles University in Prague, pp. 625-630, <http://ieeexplore.ieee.org/stamp/stamp.jsp?tp=&arnumber=5590990>.*

Richard Fairley, "Tutorial: Static Analysis and Dynamic Testing of Computer Software", 1978, Colorado State University, pp. 14-23, <http://ieeexplore.ieee.org/stamp/stamp.jsp?tp=&arnumber=1646907>.*

Davide Balzarotti, "Saner: Composing Static and Dynamic Analysis to Validate Sanitization in Web Applications", 2008, University of California, pp. 387-401, <http://ieeexplore.ieee.org/stamp/stamp.jsp?tp=&arnumber=4531166>.*

Dolby, J., "Using Static Analysis for IDE's for Dynamic Languages," Published Oct. 14, 2005, http://www.eclipse.org/org/langsymp/JulianDolby_paper.pdf.

Biggar, P., et al., "Static analysis of dynamic scripting languages," Retrieved Mar. 15, 2011, http://www.paulbiggar.com/research/wip-optimizer.pdf.

Furr, M., et al., "Profile-Guided Static Typing for Dynamic Scripting Languages," Published Apr. 2009.

Mišek, J., et. al., "Mapping of Dynamic Language Constructs into Static Abstract Syntax Trees," 9th IEEE/ACIS International Conference on Computer and Information Science, Aug. 18-20, 2010.

Abadi, M., et. al., "Dynamic Typing in a Statically Typed Language," Published Apr. 1991, http://www.hpl.hp.com/techreports/Compaq-DEC/SRC-RR-47.pdf.

Mišek, J., et. al., "Syntactic and Semantic Prediction in Dynamic Languages," Published 2009, http://ulita.ms.mff.cuni.cz/~zavoral/pub/09-SERA-Intellisense.pdf.

Aycock, "Aggressive Type Inference," Published 2009, http://www.python.org/workshops/2000-01/proceedings/papers/aycock/aycock.html.

Anderson, C., et al., "Towards Type Inference for JavaScript," Published 2009, http://pubs.doc.ic.ac.uk/typeinferenceforjavascript-ecoop/typeinferenceforjavascript-ecoop.pdf.

* cited by examiner

STATIC SEMANTIC ANALYSIS OF DYNAMIC LANGUAGES

BACKGROUND

Background and Relevant Art

Computers and computing systems have affected nearly every aspect of modern living. Computers are generally involved in work, recreation, healthcare, transportation, entertainment, household management, etc.

Computers are typically controlled using computer software. The computer software includes executable instructions that can be executed by one or more processors to cause the computer to perform various functions. Computer software may be created using source code created in a programming language. Code may categorized in several different ways. One distinctive method of categorizing computer code is categorizing it as either static or dynamic.

Static code can typically be easily analyzed before runtime as the code typically is defined before runtime and does not change at runtime, the type system is well defined before runtime and does not change at runtime, and types within the type system are defined before runtime and do not change at runtime. Compilers, before runtime, can perform static analysis on static code and provide information to developers regarding characteristics of the static code or potential problems with a body of code.

Alternatively, some computer code may be classified as dynamic. In dynamic code, new code may be added at runtime. Additionally, static code type systems are not well defined before runtime. Further still, types within a static code type system can change at runtime. Thus, static analysis, before runtime, of dynamic code is hard due to the changing nature of the dynamic code at runtime.

Dynamic languages such as JavaScript suffer from correctness issues that are difficult to identify before runtime due to the dynamic nature of the languages. While static languages can more easily identify correctness issues in a compilation step, dynamic languages do not have the same compilation step to identify such issues. Identifying these issues at runtime is typically more costly than when editing or authoring code. In some cases, diagnosing the root cause of a problem is extremely difficult due to, for example, non-obvious ways that symbols are resolved at runtime.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a computing environment. The method includes acts for analyzing dynamic source code. The method includes accessing a specific metadata format data structure. The data structure was created by obtaining one or more first data structures defining constructs in a body of dynamic language source code. From the one or more first data structures, identifier information is extracted for one or more of the defined constructs. Knowledge about the constructs is augmented. The metadata format data structure is parsed to compute metrics about the metadata format data structure. The metrics about the metadata format data structure are provided to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein may implement functionality to provide significant useful semantic analysis of dynamic language source code by static means. In one illustrative example, this is accomplished by constructing a symbol table, by declaration/annotation, inference, analysis and modeling of runtime behaviors, that provides information that would otherwise only be available at runtime during actual code execution. Metric analysis can be run against the symbol table and this information. The metric analysis can provide important details regarding various issues related to the dynamic code including correctness issues, code organization issues, runtime execution issues, dependency analysis issues, etc. For example, in some embodiments, semantic checks may be performed against the symbol table and information. The semantic checks can identify important potential correctness issues and/or areas for code improvement.

The following now illustrates details with regard to constructing a symbol table. Some embodiments illustrated herein implement an approach to generate and maintain symbolic references from source code, without literally executing code, to support a range of features related to identifying, analyzing, refactoring, etc, variables and definitions.

As intimated above, it is hard to conclusively identify symbols backing references in dynamic languages through static parsing and/or analysis. As a result, many modern editor language services today depend on code execution to generate a list of symbols at a specific source code context/scope. This approach has clear limitations and issues. It is difficult to guarantee, for example, that a breakpoint set in a JavaScript function will be hit on calling it outside of actual program/ web site execution (or that the breakpoint will be hit in a timely way). It is even less practical to consider executing code across an entire program to generate the comprehensive sort of symbol analysis that would be performed to, for example, identify all code locations that reference a given symbol.

Thus, embodiments can address these issues by implementing an approach to generate and maintain symbolic references, without literally executing code. In particular, as an alternate to code execution, embodiments may combine several components which, in concert, provide significant symbol analysis outside of a runtime environment. The result is a rich set of refactoring and other valuable integrated development environment features. An integrated development environment includes an integrated application that provides development functionality such as editing, project management, source control, compilation and/or linking, publishing, post-build verifications, etc.

Figure 1:
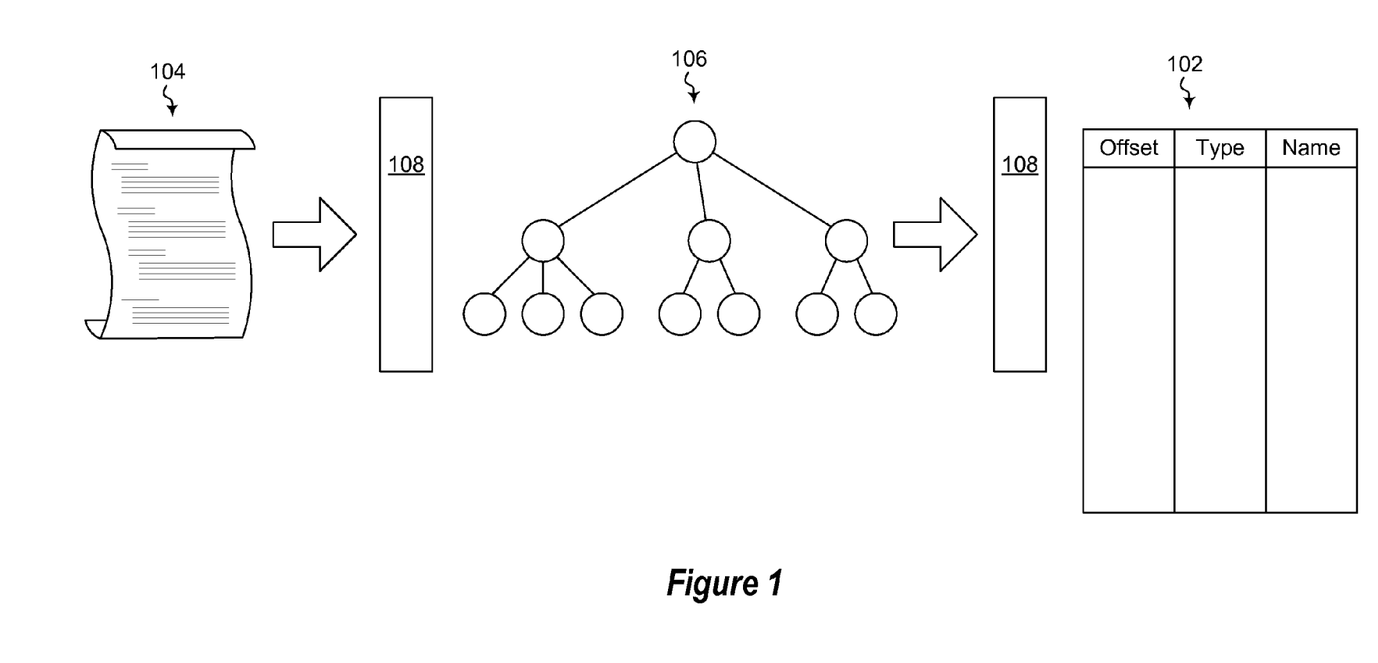
FIG. 1 illustrates transformation of a body of source code to an abstract syntax tree and use of the abstract syntax tree to create a symbol table.

Referring now to FIG. 1, in some embodiments, a symbol table 102 is constructed from implied and explicit inputs (such as, among other things, source files of a body of code 104) of a dynamic language. A symbol table data structure correlates identifiers in a program's source code with augmented information relating to its declaration or appearance in the source code. The symbol table may include, for example, correlation between an identifier and information related to type, scope level, location, etc.

In some embodiments, symbols and symbol references are read from persisted data and/or discovered and/or inferred from a multi-pass traversal of an abstract syntax tree (AST) representation 106 of a body of program code 104. While ASTs are referred to in the examples below, it should be appreciated that other types of syntax trees may be used additionally or alternatively. A symbol table 102 including mapping between source code offsets and symbolic references is constructed. This mapping can be used to implement various editor features. For example, such features may include one or more of 'go to symbol definition', 'find all references to this symbol', 'rename this variable', etc.

Illustrating now additional detail, some embodiments described herein include methods and/or apparatus to construct and understand a rich set of symbols & symbolic references, by combining several different techniques into a single system. For example, as illustrated in FIG. 1, a first technique uses one or more parsers 108 to create ASTs 106 from source code 104. The one or more parsers can construct symbol tables 102 from the AST 106 input. A second technique that may be used, in some embodiments with the first technique, includes reading and/or hydrating static, literal descriptions of symbols directly. In particular, if symbols can be determined by static analysis or inferences, this technique could be used to resolve some symbols. A third technique that could be used with other techniques includes using type inferencing code that models runtime type resolution. This could be augmented by static annotations that signify type information and/or declarations for variables. A fourth technique that could be used with other techniques includes using code and/or extensibility points that model symbol table manipulation based on an understanding of runtime behaviors of both a platform itself and/or calls to specific APIs. A fifth technique that could be used with other techniques includes defining and/or enforcing coding guidelines provided to developers that help maximize discoverability of relevant information. In some embodiments, enforcing guidelines may be facilitated by using coding tools to drive enforcement of the coding guidelines.

Figure 2:
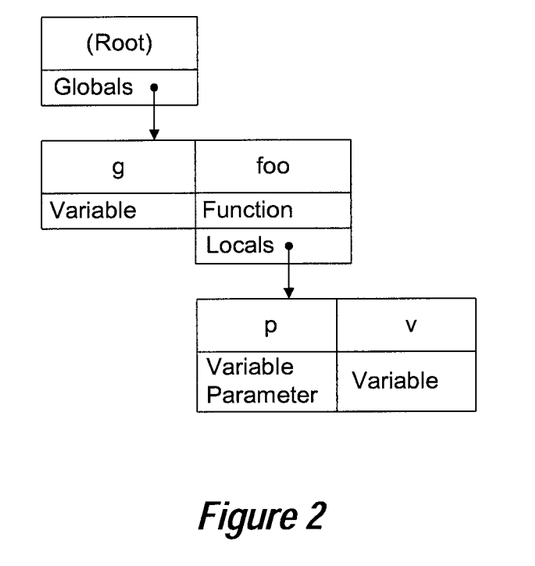
FIG. 2 illustrates an example symbol table.
Figure 3:
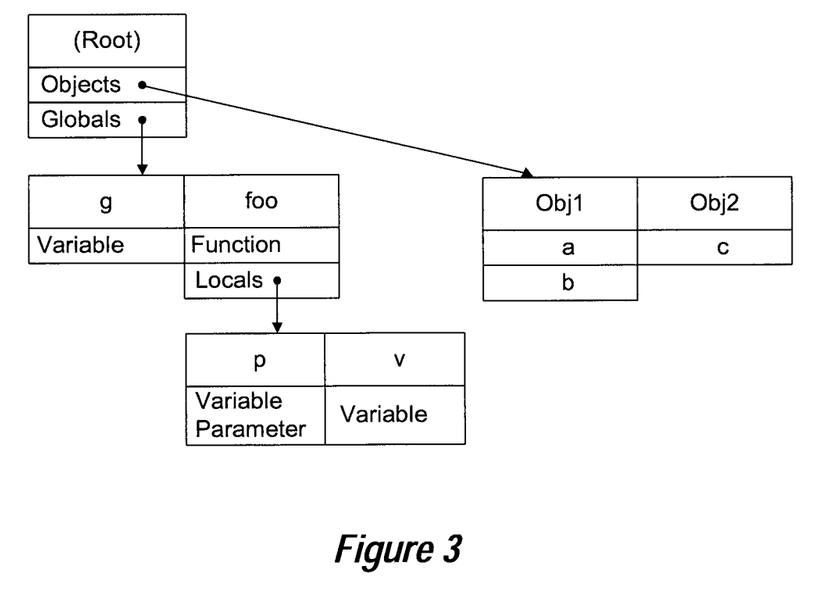
FIG. 3 illustrates another example symbol table.

FIGS. 2 & 3 illustrate example symbol tables raised from provided source code. Referring now to FIG. 2, an example symbol mapping is illustrated for the following code:

```
var g;
function foo(p) {
    var v;
}
```

The example demonstrates raising symbols from a variable declared at global scope ('g'), a function 'foo' also declared at global scope, a parameter 'p' (the scope of which is constrained to function 'foo') and a local variable 'v', also constrained in scope to 'foo'. The illustration shows the hierarchical relationship of these symbols. Referring now to FIG. 3, an example symbol mapping is illustrated for the following code

```
var g = {
    a: null,
    b: null
};
function foo(p) {
    var v = {
        c: null
    };
}
```

Additional details are now illustrated. It should be appreciated that while the following examples illustrate specific types, functions, etc., other embodiments may use similar or equivalent types, functions, etc. In particular, naming strategies should not be considered limiting, but rather are used for concreteness and illustration. Illustrating now further details, a first parser pass illustrating general AST 106 and hierarchical symbol table 102 construction is illustrated. In the first pass, a set of inputs is identified, either explicitly (for example, using a command-line provided by a user or a program project file maintained in an integrated development environment) or implicitly (for example, by scanning product source code 104, making assumptions about a runtime execution environment, inferring dependencies from in-source information such as links to JavaScript, XML doc comments, etc).

Figure 4:
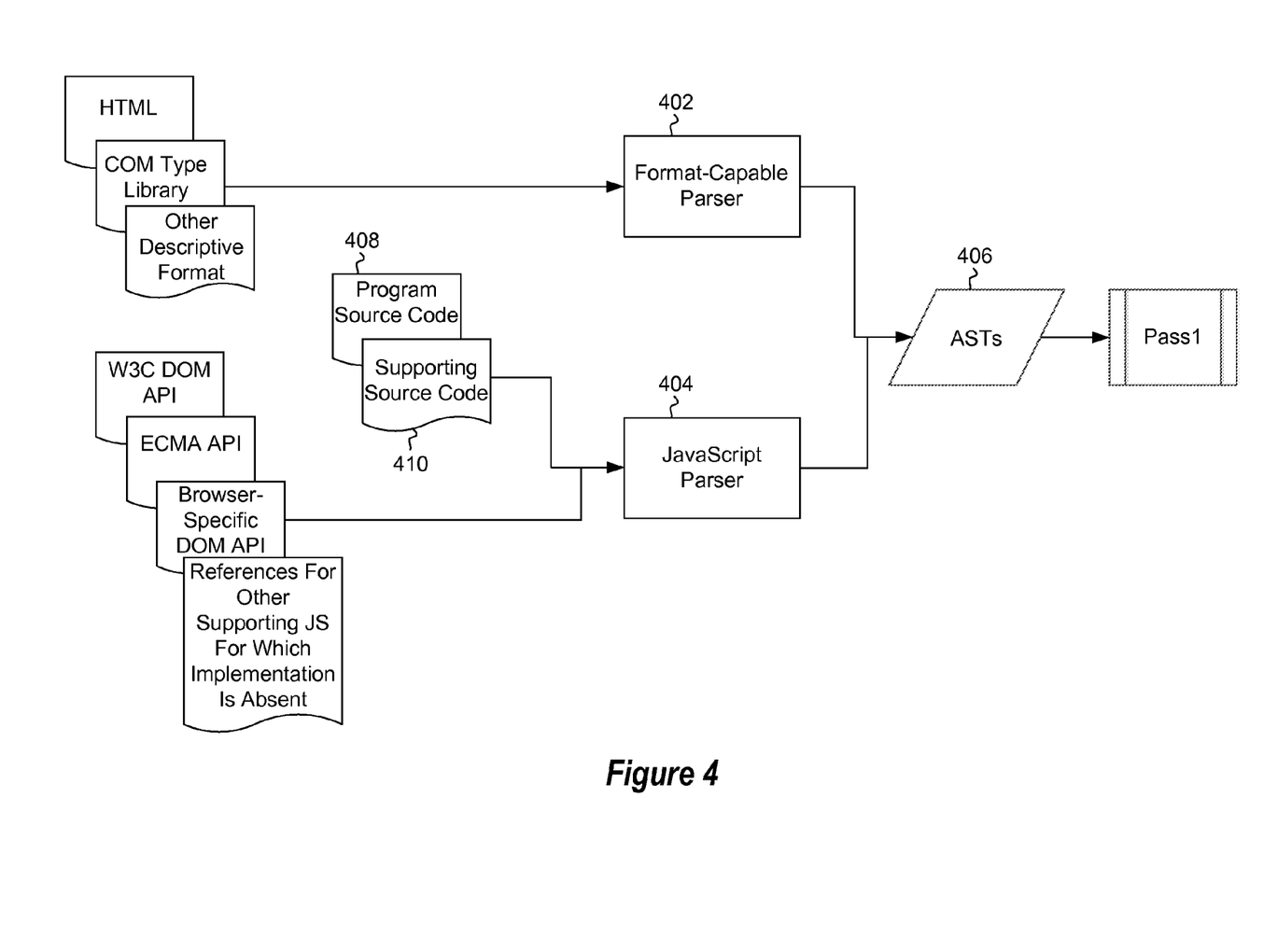
FIG. 4 illustrates parsers used for parsing code into one or more abstract syntax trees.

Referring now to FIG. 4, a specific example of tools used to analyze JavaScript applications are illustrated. While FIG. 4 illustrates a specific JavaScript example, it should be appreciated that other embodiments can use similar elements for other dynamic bodies of source code. FIG. 4 illustrates two parsers, a format-capable parser 402 and a JavaScript parser 404. The parsers can parse various bodies of computer code to produce ASTs 406, such as the AST 106 illustrated in FIG. 1.

Embodiments can include source code which falls, in some examples, into one of three categories: 1) product code, 2) other supporting 'framework' code, and 3) other supporting 'reference' code, all of which is represented by the body of source code 104 illustrated in FIG. 1. The JavaScript parser 404 is able to parse product code or program source code 408. Product code refers to the source code that comprises the user source, which is typically the target of the analysis (ie, the source code for which useful information or functionality is raised against). The JavaScript parser 404 may also parse supporting source code 410. Supporting source code 410 may include source code that facilitates execution of the program source code. For example, supporting source code 410 may include framework source code. In general, supporting source code may be code that is not part of a particular program, but that can be used to provide more information about the program. For example, supporting source code may be one or more declarations of types. Supporting 'framework' code, refers to code that also executes at runtime but which is picked up from the system, other 3rd-parties, or which simply should not be regarded as of primary interest in the current scenario. Supporting 'reference' code, refers to augmenting information which happens to be rendered in the format of the dynamic language (because this is convenient, both for tooling and for maintenance by developers). 'Reference' code is consumed by the tool only, it is not executed at runtime.

Input files may be read sequentially and abstract syntax trees 106 created for them. The ASTs 406 are subsequently traversed and a hierarchical symbol table (such as the symbol table 102 illustrated in FIG. 1) is constructed from them that expresses scoping of all discovered symbols. Symbols for functions are constructed in this phase.

A pass subsequent to the first pass may be performed to accomplish type inferencing and member population. During the subsequent pass, types are resolved as far as possible. In some embodiments, types may be resolved, for example, by inference and check. Also during the subsequent pass member symbols are populated. This subsequent pass is not performed in sequential order. The following illustrates heuristics used to determine the order in which the code is analyzed. Global code is analyzed first. Functions (both declarations and function expressions) are queued up for execution, and ceteris paribus will be analyzed in the same order they were found after all global code has been analyzed. A call to a function will cause it to be analyzed ad hoc, being removed from the queue, if present, or added to it if not. When performing the latter step, 'Miranda' prototyping rules are used, meaning that if the types of the parameters to a function are not known, they will be supplied by the known types of the arguments at the first function call point.

In the following description, much of the descriptive information is specific to JavaScript. However, it should be noted that these examples are merely illustrative and other embodiments may be used with other languages. Type inferencing is performed in a bottom-up fashion. As the parser 108 recursively walks the AST 106, it bubbles up types for sub-expressions recursively and applies rules to infer type expressions whose type is unknown. The following illustrate rules that may be applied. Literals (Boolean values, strings, numbers, null, objects, arrays) denote their own type. Identifiers that refer to functions are of type Function. Identifiers that refer to symbols whose types have been inferred are of the same type as the symbol to which they refer. Additive expressions are of type String if either operand is a String, in which case both sides are inferred to be of type String. Other additive expressions and all other arithmetic expressions (both binary and unary) are of type Number, and their operands are inferred to be of type Number. Boolean expressions (both binary and unary) are of type Boolean, and their operands are inferred to be of type Boolean. Function call expressions are of the same type as the function being called has been inferred to return. "New" expressions are of the type designated by the function used in the new expression. Return statements cause the current function to be inferred to return the type of the return expression. Control flow statements (for loops, ifs, switches, returns, etc.) are of type "void" (or "undefined" in JavaScript). For inference rules above, it is possible to use annotations (see below) to explicitly define types.

In some embodiments, functions are categorized into one of four categories, i.e.: unknown, static functions, member functions, or constructors. A function may be initially unknown and is categorized based on usage. A function called directly is considered static. A function called through on an object instance is the objects member function. A function used in a new expression is marked as a constructor. As with types, the annotations mechanism can also impact categorization of functions.

Illustrating now a particular special case, JavaScript includes a keyword 'this.' The 'this' keyword refers to the execution context of a function, which can differ for each function call. The resolution of 'this' in JavaScript is dependent on runtime information complicating performance of a complete static analysis. Embodiments may use a number of now illustrated heuristics to determine to what a reference to 'this' refers. If the context is global code or if the function is static or unknown, then 'this' evaluates to a symbol that represents the global scope (e.g., the "window" object in browsers). If the context is a constructor, then 'this' evaluates to a prototype object of the function it represents. If the context is a function being assigned to an object member, then 'this' evaluates to the object. If the context is a member function, then 'this' evaluates to the prototype of the function that declares the type of the member on which this function is being called. It is possible to use language augmentations (annotations) to describe the binding of the function and override the above heuristic rules.

For property accessors, the type of the left-hand side expression is evaluated and the right-hand side identifier is sought in the symbol table, following the relevant type's prototype chain.

Some embodiments may implement or support direct symbol hydration and symbol hydration with alternate parsers. Embodiments may provide a mechanism for directly populating the symbol table 102 based on parsing inputs other than literal source code that will execute at runtime. In one illustrative example, the JavaScript parser 404 may further include functionality for parsing application programming interface (API) code. For example, FIG. 4 illustrates the JavaScript parser 404 parsing API code for W3C APIs, ECMA APIs, and browser-specific Document Object Model (DOM) APIs. W3C DOM API, ECMA(X) API (such as Math functions), JavaScript API, COM objects, browser-specific API, browser specific DOM extensions, etc, can be expressed as (generally bodiless) JavaScript functions/variables that are passed to the AST analyzer described above. The JavaScript parser 404 may further include functionality for parsing reference code for other supporting JavaScript for which implementation is absent. This may be functionality (functions, types, etc.) that are assumed to be available during runtime, but are not part of the program. Reference code refers to metadata sufficient to model symbolic references which cannot be computed and/or inferred from production code. This may include the body of executable API that is provided as built-in browser/ECMA script functionality (such as the HTMLElement class and JS Math functions). This may include 'foreign' api that model code which is callable due to some interop mechanism (such as calling into a COM object or a web service). Reference code may include 'type definitions' which are superimposed onto production code but which are otherwise irrelevant at runtime. In a reference file, for example, embodiments may include a description for a type that includes only two methods, foo and bar. In a product file, a parameter may be annotated as being of this type. At analysis time, embodiments can ensure that only methods named foo or bar are called on that parameter.

The format-capable parser 402 is configured to parse HTML, COM type libraries, and other descriptive formats as now described in more detail. APIs that are 'foreign' to the language/runtime (i.e., for which some sort of special interop code is required to execute at runtime, e.g., COM objects) can be added to the symbol table by parsing relevant descriptive formats (such as type libraries) and/or these descriptions can be converted to a format (such as in the particular illustrated example, JavaScript) which can be fed directly to the symbol table construction code. The system can accept static (such as user-authorable) descriptions of symbols as well as extensions that parse arbitrary data formats and populate the symbol table accordingly. An example of the latter is an extension that parses HTML to populate the symbol table with DOM elements expressed in mark-up that are accessible to JavaScript code (such as calls to getElementsById). There is some tolerance in the system for errors and/or incompleteness of reference data as distinct from production code (which will be modified and/or analyzed within the editor).

Some embodiments may implement or facilitate extensions that model runtime symbol construction. Embodiments may provide a mechanism for populating the symbol table not merely with code as it is analyzed but, in some cases, based on the result at runtime when executing that code. Some useful examples relate to JavaScript utility code that constructs and populates object instances with members. Ecma5 JavaScript provides helpers such as object.createProperty which can, in some cases, be modeled by the system. String literals passed to eval can be parsed into AST and injected into the AST and/or symbol table.

Some embodiments may benefit from constraining development practices to maximize code discoverability. There are typically a set of coding guidelines/practices that have a high return as far as helping with the ability of embodiments to function with a correspondingly low impact on the expressiveness and/or utility of the dynamic language. One example of such a constraint is directing developers to avoid use of eval statements in JavaScript. In some embodiments, these constraints may be enforced by coding tools which prevent developers from violating constraints, or at least warn a developer if they are about to break or exceed a constraint.

Embodiments may include a mechanism for reporting conditions to users that limit the ability to analyze source. In particular, there may arise situations in which dynamic source code cannot be completely analyzed and/or all symbols resolved. Embodiments can include functionality to indicate such to developers when such conditions arise.

Using the symbol table, embodiments may implement a number of other functionalities. For example, embodiments may implement various editor features such as one or more of 'go to symbol definition', 'find all references to this symbol', 'rename this variable and all references to it', etc.

Embodiments may include functionality to create or use an ability to display a representation of implicitly available API, for informational purposes and to potentially serve as both the target for 'go to reference' or the source for 'find all references to this symbol' features.

Embodiments may include functionality to create or use a mechanism for modeling symbol construction based on analyzed code. Embodiments may include call sites to an API that constructs a class object based on a set of input parameters. For example, input parameters could be transformed into symbols that represent actual objects as they will be available at runtime, based on analyzed code.

Embodiments may include functionality to create or use a mechanism for specifying, authoring/edited descriptive inputs representing symbol tables entries, in formats such as XML, native JavaScript, etc. This may also include the ability to parse HTML to identify runtime-available objects. For example embodiments may be able to identify elements marked with a specific identifier (such as an HTML 'id' attribute).

Embodiments may include functionality to create or use an ability to annotate source code with 'type' information. This may allow embodiments to jump to a type or object definition that might exist as actual project source or is solely represented in generated code and/or static descriptive input files.

Embodiments may include functionality to create or use an ability to annotate source code files with (or otherwise associate) a set of dependencies (such as another supporting JavaScript file) used to construct a comprehensive symbol space for analysis.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
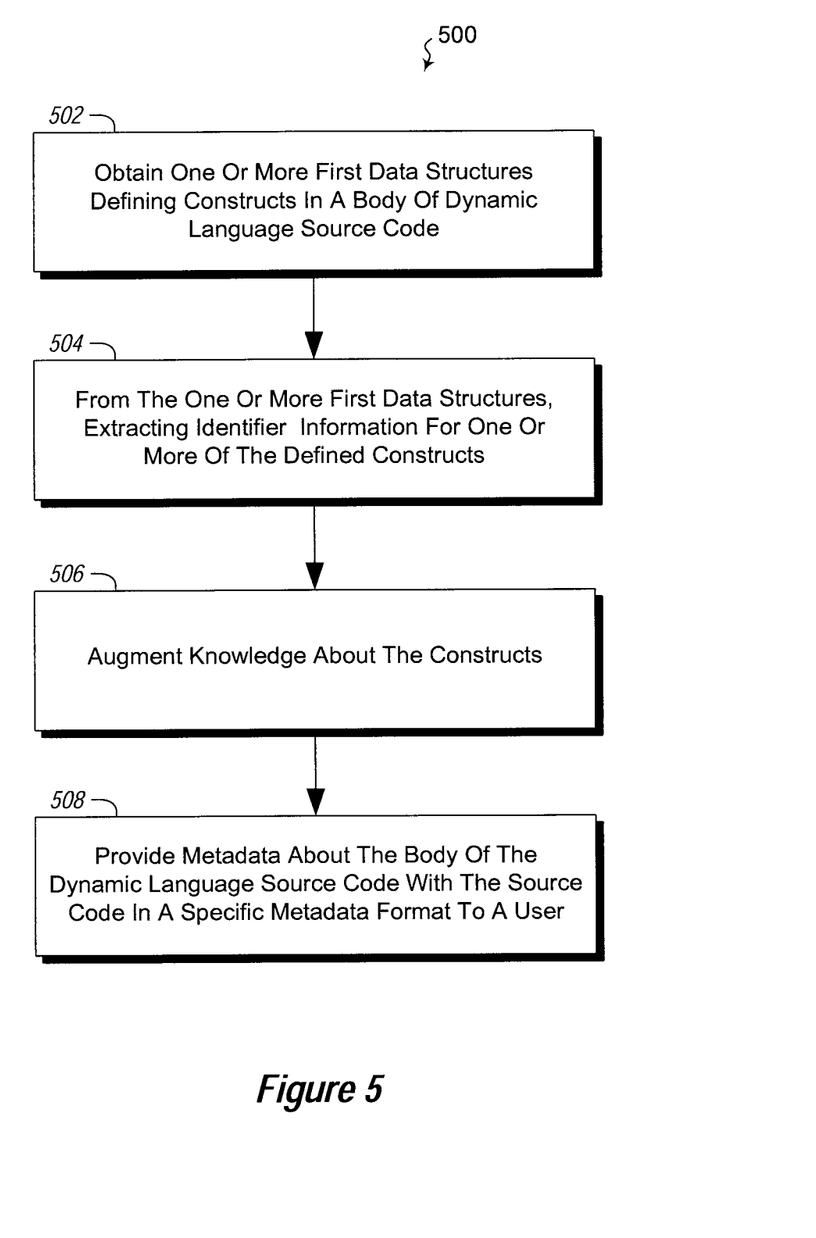
FIG. 5 illustrates a method of creating metadata for dynamic code.

Referring now to FIG. 5, a method 500 is illustrated. The method 500 may be practiced in a computing environment. The method 500 includes acts for creating metadata for dynamic code in a descriptive metadata language. The method includes obtaining one or more first data structures defining constructs in a body of dynamic language source code (act 502). For example, in some embodiments, the one or more first data structures comprise at least one of a syntax tree or an abstract syntax tree. FIG. 1 illustrates a abstract syntax tree 106 derived, at least in part from a body of source code 104. In the example illustrated in FIG. 1, the abstract syntax tree 106 is the specific example of a data structure.

The method 500 further includes, from the one or more first data structures, extracting identifier information for one or more of the defined constructs (act 504). For example, embodiments may extract symbol names into a symbol table.

The method 500 further includes augmenting knowledge about the constructs (act 506). Augmenting knowledge about the constructs can be accomplished in a number of different ways. For example, augmenting may be based on explicit inspection of the body of dynamic language source code. For example, the dynamic language source code may include comments in the code that can be used to augment knowledge about constructs in the code. Explicit inspection of the body of dynamic language source code may include inspection of code that is a surrogate for an actual implementation or which models code that is not explicitly expressed in source code form. For example, this may include cases of dropping in reference files to replace 3rd party frameworks in an analysis tool chain as well as modeling things like built-in DOM API (which have no actual representation as JavaScript source code.

Alternatively or additionally, augmenting may be based on one or more implied inferences. For example, if it can be determined that source code concatenates to a string literal using an object as an operand, it can be determined that the resulting object is a string. If an arithmetic operation is performed using an object as an operand, it can be determined that the object is a numerical type, such as an integer or floating point. Inferences may be may be made based on a framework supporting source code. For example, knowledge about a framework and knowing how that framework will consume source code can facilitate inferring addition information about the source code. Similarly, context can be used to infer additional information. For example, context such as a browser which source code will be used with and knowing how that browser will interact with source code can facilitate inferring addition information about the source code. Further still, stand in code can be used to make inferences to augment knowledge about source code. Stand-in code provides an alternate body (that is, implementation) of a function that is expressly designed to assist in computing symbolic information for variables that are within scope (as opposed to being intended to execute at runtime). This is an alternate approach to analyzing the actual implementation of a function to acquire information or depending strictly on annotations.

Embodiments could be implemented that include augmentation as a result of folding in runtime collected data. In particular, embodiments may instrument the runtime to provide information about how the type of set of types that a parameter resolved to at a specific code location. This new information may be folded into the augmented information.

Embodiments could be implemented that include augmentation as a result of modeling the results of executing code. For example, embodiments of the method 500 may be performed where augmenting includes modeling the effects upon a symbol table that would result from executing a call to one or more functions based on explicit, inferred or computed call site details. For example, assume that an embodiment has knowledge of a function constructNamespace(namespaceName), which creates a global object of the name that is passed in as an argument. During analysis, when embodiments observe a call site constructNamespace("My.Namespace"), the tool could add the specified namespace object to the symbol table so that it is subsequently available when processing the remainder of the function. Other embodiments may implement a more complicated path analysis to calculate a number of possible paths through the function, with implied arguments provided to a callee. For example, embodiments may implement symbolic execution, abstraction interpretation, control and data flow analysis, etc.

Alternatively or additionally, augmenting may be based on user input. For example a user interface using a command line tool and/or graphical based tool may be used to augment the body of dynamic language source code. For example, a user can provide additional information about objects in code, similar to how commenting might work, but without needing to formally comment the source code. Rather, the tool may be used to allow a user to make external comments about source code.

The method 500 further includes providing metadata about the body of the dynamic language source code with the source code in a specific metadata format to a user (act 508). For example, and as illustrated previously, the specific metadata format may include a symbol table.

The following now illustrates semantic static analysis that can be implemented in some embodiments.

Embodiments may alternatively or additionally include parsing the metadata format data structure to compute metrics about the metadata format data structure and providing the metrics about the metadata format data structure to a user.

In some embodiments, the metrics may provide code correctness analysis. For example, calls to functions which cannot be resolved to a symbol (indicating a possible typographical error and/or runtime failure to bind to an existing function) may be detected and indicated.

For example, the correctness analysis may indicate the existence of duplicate local members in a construct. For example, duplicate variable definitions within a function body may be detected and indicated.

Alternatively or additionally, the correctness analysis indicates the existence of duplicate members in an object. This may include the existence of duplicate members in a global space.

Alternatively or additionally, the correctness analysis indicates the existence of duplicate cases in a switch block or conditional statement. For example, an if-then-else block may include duplicate cases. This can be detected by codepath analysis against the symbol table, and indicated to a user.

Alternatively or additionally, the correctness analysis indicates issues related to contextual use of certain expressions. For example, embodiments may indicate the presence of return statements in global code. In other embodiments, the correctness analysis might assume a specific runtime environment such as one or more browser families (such as Microsoft Internet Explorer), browser versions, browser execution modes (such as ECMA 'strict' mode) and alter results accordingly.

Alternatively or additionally, the correctness analysis indicates scope clobbering for local symbols. This may be particularly useful in dynamic languages where typographical errors, and such do not result in compile and/or link-time errors.

Alternatively or additionally, the correctness analysis indicates type conflicts discovered during a type inferencing phase as errors. In particular, errors can be indicated when an expression has a different type than what it is inferred and/or annotated to have.

Alternatively or additionally, the correctness analysis indicates parameter count mismatches.

Alternatively or additionally, the correctness analysis identifies unreachable code. In particular the codepath analysis against the symbol table may be able to help pinpoint when code is not reachable from other code in a source code body. For example, embodiments may indicate conditional clauses that evaluate to a constant condition, thereby rendering some portion of the conditional statement unreachable.

Alternatively or additionally, the correctness analysis indicates return type mismatches across different code paths. In particular, for best reliability, it is helpful for functions to return objects of a consistent type. The symbol table can be used to identify return of inconsistent types from a function. Exceptions can be regarded as a kind of return type as well and additional embodiments might factor exception raising behavior into the correctness analysis.

Alternatively or additionally, the correctness analysis indicates return completeness issues. In particular, the symbol table can be used to determine all codepaths returning values and those not returning values.

Alternatively or additionally, the correctness analysis indicates failure to explicitly declare variables before use. Requiring developers to explicitly provide the 'liar' keyword when declaring variables in JavaScript does not significantly increase cost of development and has little to no impact on language expressiveness. With this standard in place, an analysis that flags implicit variable declarations flags typos and/or correctness problems in code. Due to JavaScript's scoping rules, an undeclared variable that appears within one function will be declared at global scope, making it viewable to all. This can be the source of extremely subtle and hard-to-debug runtime issues, particularly if a variable of the same name that was intended to be local in a separate function was also specified without the 'liar' keyword. Thus, these issues can be discovered using the symbol table and indicated to a user.

Alternatively or additionally, the correctness analysis indicates unexpected line terminations and/or dependence on virtual semicolons.

Alternatively or additionally, the correctness analysis opportunistically provides early discovery of syntax and/or parsing errors.

In some embodiments, the metrics may provide code organization analysis.

For example, the code organization analysis may be related to closure detection. A closure is the local variables for a function kept alive after the function has returned, or a closure is a stack-frame which is not deallocated when the function returns. A closure is formed when one of those inner functions is made accessible outside of the function in which it was contained, so that it may be executed after the outer function has returned. Embodiments may include functionality to detect closures.

Alternatively or additionally, the metrics provide code runtime execution analysis. In some embodiments, for example, the symbol table might be manipulated during analysis in order to model runtime code execution.

Alternatively or additionally, the metrics provide code dependency analysis.

Embodiments may include functionality for performing a directed query of the metrics. For example, embodiments may identify all places calls to a specific function are made.

Embodiments may further include accessing a plurality of metadata data structures and performing a delta analysis on the data structures to determine differences in bodies of source code. Thus, some embodiments may compare two different symbol tables to determine the differences between the symbol tables and thus the bodies of source code.

Embodiments may be implemented where the metrics are embedded into the specific metadata format data structure. For example, a symbol table may include some of the metrics described herein embedded in the symbol table itself.

Illustrating now a specific example, consider the following source code:

```
///   <dictionary target= 'all'>
///        eval, obj
///   <dictionary>
///   <disable>JS2076, JS3056</disable>
      <setting key= 'JS2058.DoNotUseIncrementAndDecrementOperators.Strict'>true</setting>
function consumesMyClass(/* @type(MyClass) */myClass) {
       var myField = myClass.instanceField
       myClass.instanceMember(10)
       var myClassBaseField = myClass.baseField;
       myClass.baseMember(1, 2, 3);
};
```

This code is now used to demonstrate various in-source mechanisms for configuring analysis, augmenting symbol construction, and managing results. The first annotations are expressed as in-source XML document comments and represent, in order, a dictionary that is used when spellchecking code identifiers, a comment that disables analysis for checks labeled as JS2076 and JS3056 (or suppresses reporting of results for these checks), and a setting that configures the analysis of another check, JS2058, in order to put it in a strict reporting mode.

The code example further illustrates an inlined C-style comment that specifies the type, 'MyClass' for a parameter of a function. The definition of MyClass could be specified by annotation elsewhere in the code, or the symbol might be constructed during a pass by code that models the result of runtime calls, creates symbols for 'foreign' api such as COM objects/other interop models, etc.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a processor-implemented method of analyzing dynamic source code, the method comprising:
    parsing source code to generate one or more syntax trees defining constructs in a body of dynamic language source code;
    from the one or more syntax trees, extracting identifier information for one or more of the defined constructs;
    augmenting knowledge about the constructs by at least one of explicit inspection of the body of source code or implied references related to the source code;
    producing a correlation between identifiers and augmented knowledge;
    using the identifier information and augmented knowledge, generating metadata about the body of the dynamic language source code, the generated metadata being represented as a symbol table;
    parsing symbol table to compute metrics about the one or more syntax trees; and
    providing the metrics about the one or more syntax trees to a user, wherein the metrics provide code correctness analysis, and wherein the correctness analysis indicates parameter count mismatches.

2. The method of claim 1, wherein the correctness analysis indicates the existence of duplicate local members in a construct.

3. The method of claim 1, wherein the correctness analysis indicates the existence of duplicate members in an object or type.

4. The method of claim 1, wherein the correctness analysis indicates the existence of duplicate cases in a switch block.

5. The method of claim 1, wherein the correctness analysis indicates issues related to contextual use of certain expressions.

6. The method of claim 1, wherein the correctness analysis indicates scope clobbering for local symbols.

7. The method of claim 1, wherein the correctness analysis indicates type conflicts discovered during a type inferencing phase as errors.

8. The method of claim 1, wherein the correctness analysis identifies unreachable code.

9. The method of claim 1, wherein the correctness analysis indicates return type mismatches across different code paths.

10. The method of claim 1, wherein the correctness analysis indicates return completeness issues by indicating at least one of codepaths returning values or codepaths not returning values.

11. The method of claim 1, wherein the correctness analysis indicates failure to explicitly declare variables before use.

12. The method of claim 1, wherein the correctness analysis indicates unexpected line terminations.

13. The method of claim 1, wherein the correctness analysis opportunistically provides early discovery of syntax/parsing errors.

14. The method of claim 1, further comprising performing a directed query of the metrics.

15. The method of claim 1, wherein the metrics are embedded into the specific metadata format data structure.

16. The method of claim 1, further comprising accessing second data structure and performing a delta analysis.

17. One or more computer readable memory comprising computer executable instructions that when executed by one or more processors cause one or more processors to perform the following:
    parsing source code to generate one or more syntax trees defining constructs in a body of dynamic language source code;
    from the one or more syntax trees, extracting identifier information for one or more of the defined constructs;
    augmenting knowledge about the constructs by at least one of explicit inspection of the body of source code or implied references related to the source code;
    producing a correlation between identifiers and augmented knowledge;
    using the identifier information and augmented knowledge, generating metadata about the body of the dynamic language source code, the generated metadata being represented as a symbol table;
    parsing symbol table to compute metrics about the one or more syntax trees; and
    providing the metrics about the one or more syntax trees to a user, wherein the metrics provide code correctness analysis, and wherein the correctness analysis indicates parameter count mismatches.

18. In a computing environment, a system for analyzing dynamic code, the system comprising:
    one or more processors;
    one or more computer readable media coupled to the one or more processors, wherein the one or more computer readable media comprise computer executable instruction that when executed by one or more of the one or more processors cause one or more of the one or more processors to perform the following:
- parsing source code to generate one or more syntax trees defining constructs in a body of dynamic language source code;
- from the one or more syntax trees, extracting identifier information for one or more of the defined constructs;
- augmenting knowledge about the constructs by at least one of explicit inspection of the body of source code or implied references related to the source code;
- producing a correlation between identifiers and augmented knowledge;
- using the identifier information and augmented knowledge, generating metadata about the body of the dynamic language source code, the generated metadata being represented as a symbol table;
- parsing symbol table to compute metrics about the one or more syntax trees; and
- providing the metrics about the one or more syntax trees to a user wherein the metrics provide code correctness analysis, and wherein the correctness analysis indicates parameter count mismatches.

19. The computer readable storage medium of claim 17, further comprising performing a directed query of the metrics.

20. The method of system of claim 18, further comprising performing a directed query of the metrics.

* * * * *